US012698970B2

(12) United States Patent
Pan et al.

(10) Patent No.: US 12,698,970 B2
(45) Date of Patent: Aug. 4, 2026

(54) DIFFERENTIABLE LEARNING OF SCALABLE MULTI-AGENT NAVIGATION POLICIES

(71) Applicant: Tencent America LLC, Palo Alto, CA (US)

(72) Inventors: Zherong Pan, Bellevue, WA (US); Xifeng Gao, Bellevue, WA (US); Kui Wu, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 852 days.

(21) Appl. No.: 18/097,594

(22) Filed: Jan. 17, 2023

(65) Prior Publication Data
US 2024/0240948 A1　　Jul. 18, 2024

(51) Int. Cl.
G06N 3/045　　　(2023.01)
G01C 21/20　　　(2006.01)
G06N 3/0464　　　(2023.01)

(52) U.S. Cl.
CPC ............. G01C 21/20 (2013.01); G06N 3/045 (2023.01); G06N 3/0464 (2023.01)

(58) Field of Classification Search
CPC ....... G06N 3/045; G06N 3/0464; G01C 21/20
See application file for complete search history.

(56) References Cited

U.S. PATENT DOCUMENTS

| | | |
|---|---|---|
| 2020/0249674 A1 | 8/2020 | Dally et al. |
| 2022/0084272 A1 | 3/2022 | Wang et al. |
| 2024/0013406 A1* | 1/2024 | Chen ...................... G06V 20/64 |
| 2025/0128419 A1* | 4/2025 | Lai ......................... B25J 9/1666 |

OTHER PUBLICATIONS

Li, Qingbiao, et al. "Graph neural networks for decentralized multi-robot path planning." 2020 IEEE/RSJ international conference on intelligent robots and systems (IROS). IEEE, 2020. (Year: 2020).*

(Continued)

*Primary Examiner* — Hal Schnee
(74) *Attorney, Agent, or Firm* — Crowell & Moring LLP

(57) ABSTRACT

Methods, apparatus, and computer readable storage medium for navigating multiple objects from initial positions towards target positions are described in the present disclosure. The method includes obtaining an initial configuration and a target configuration, the initial configuration comprising initial positions of multiple objects, and the target configuration comprising target positions of the multiple objects; inputting the initial configuration and the target configuration into a neural network to generate a set of kernel parameters; constructing a kernel-based divergence-free velocity field based on the set of kernel parameters; interpolating the kernel-based divergence-free velocity field to extract predicted velocities of the multiple objects; generating next positions of the multiple objects based on the predicted velocities according to a differentiable navigation algorithm; and iteratively taking, until a condition is satisfied, next configuration as the initial configuration and feeding the next configuration into the neural network to begin next iteration.

20 Claims, 12 Drawing Sheets

(56) References Cited

OTHER PUBLICATIONS

International Search Report and Written Opinion regarding PCT/US 23/75772 dated Mar. 19, 2024, 6 pages.
Rehder, E., "Probabilistic Goal-Directed Pedestrian Prediction by Means of Artificial Neural Networks," Karlsruher Instituts fur Technologie (KIT), KIT-Fakult~t fur Maschinenbau, Doctoral Dissertation, Feb. 11, 2022, Retrieved from the Internet: https://publikationen.bibliothek.kit.edu/1000152999/149736502, 59 pages.
Kurunathan, H. et al., "Machine Learning-Aided Operations and Communications of Unmanned Aerial Vehicles: A Contemporary Survey," arXiv Preprint, Nov. 7, 2022, 36 pages. Retrieved from the Internet: https://arxiv.org/pdf/2211.04324.pdf.

* cited by examiner

100

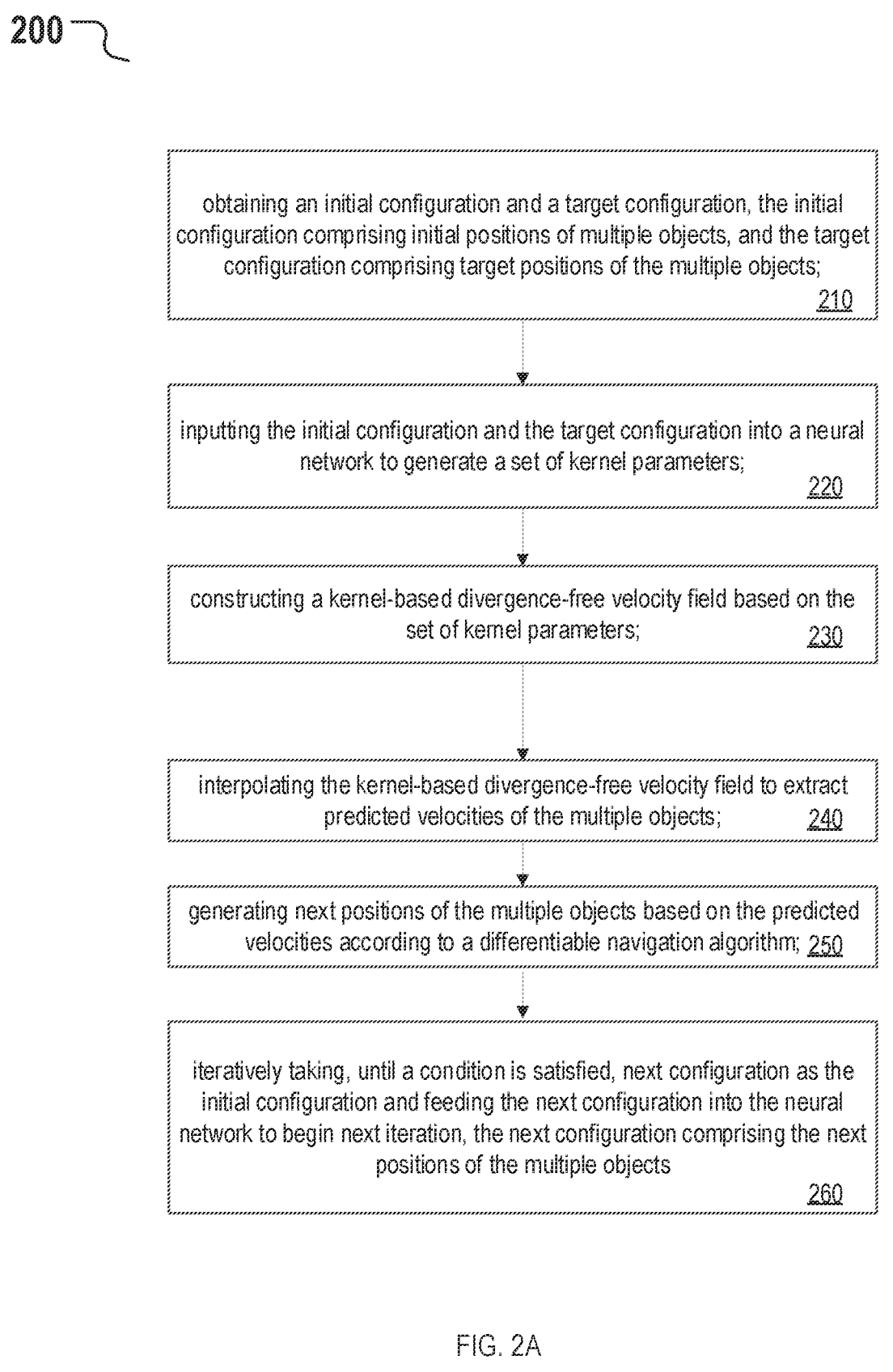

200 obtaining an initial configuration and a target configuration, the initial configuration comprising initial positions of multiple objects, and the target configuration comprising target positions of the multiple objects;
210 inputting the initial configuration and the target configuration into a neural network to generate a set of kernel parameters;
220 constructing a kernel-based divergence-free velocity field based on the set of kernel parameters;
230 interpolating the kernel-based divergence-free velocity field to extract predicted velocities of the multiple objects;
240 generating next positions of the multiple objects based on the predicted velocities according to a differentiable navigation algorithm;
250 iteratively taking, until a condition is satisfied, next configuration as the initial configuration and feeding the next configuration into the neural network to begin next iteration, the next configuration comprising the next positions of the multiple objects
260

FIG. 2A

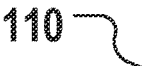
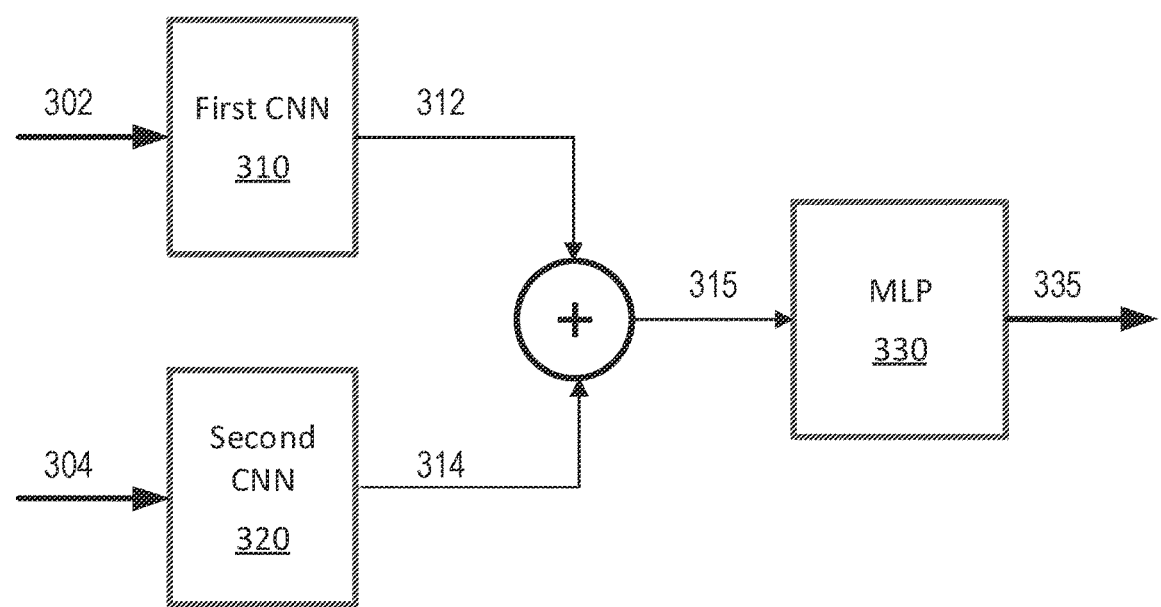
FIG. 3A
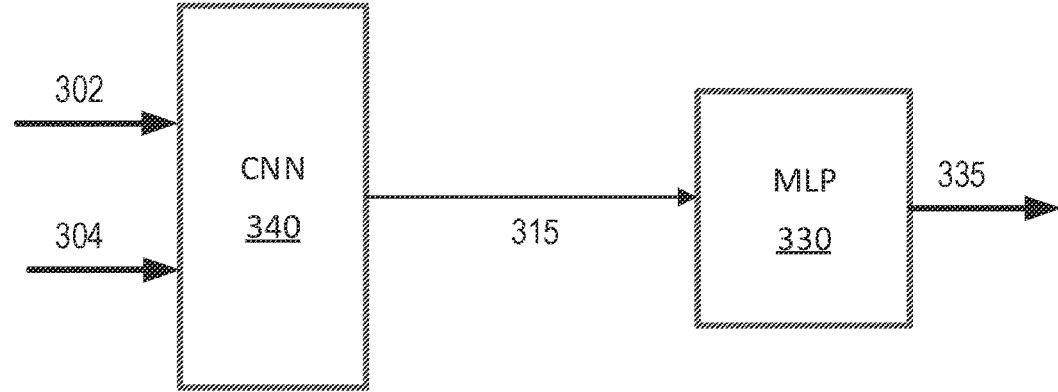
FIG. 3B

Algorithm 1:  Differentiable Crowd Simulation: $f(x_i^t, v_i^t)$

Input: $x_i^t, v_i^t, \epsilon_g > 0, \gamma \in (0,1)$
Output: $x_i^{t+\Delta t}$
1: $\quad x_i^{t+\Delta t} \leftarrow x_i^t$
2: $\quad$ while $\|\partial E / \partial x_i^{t+\Delta t}\|_\infty > \epsilon_g$ do
3: $\qquad$ Find search direction $d_i$ using Newton's method
4: $\qquad \alpha \leftarrow 1$
5: $\qquad$ while True do
6: $\qquad\quad$ if Segments $x_i^{t+\Delta t} \leftrightarrow x_i^{t+\Delta t} + \alpha d_i$ intersects then
7: $\qquad\qquad \alpha \leftarrow \gamma \alpha$
8: $\qquad\quad$ else if $E(x_i^{t+\Delta t}) \geq E(x_i^{t+\Delta t} + \alpha d_i)$ then
9: $\qquad\qquad \alpha \leftarrow \gamma \alpha$
10: $\qquad\quad$ else
11: $\qquad\qquad x_i^{t+\Delta t} \leftarrow x_i^{t+\Delta t} + \alpha d_i$
12: $\qquad\qquad$ Break
13: $\quad$ Return $x_i^{t+\Delta t}$

FIG. 6

| Layer | Kernel | Stride | #Filters/#Neuron | Activation |
|---|---|---|---|---|
| $\text{Conv}_1$ | (7,7) | 1 | 8 | MaxPool.+ReLU |
| $\text{Conv}_2$ | (7,7) | 1 | 12 | MaxPool.+ReLU |
| $\text{Conv}_3$ | (5,5) | 1 | 16 | MaxPool.+ReLU |
| $\text{Conv}_4$ | (3,3) | 1 | 20 | MaxPool.+ReLU |
| $\text{MLP}_1$ | / | / | 128 | ReLU |
| $\text{MLP}_2$ | / | / | 5K | Sigmoid |

FIG. 7

Figure 8:
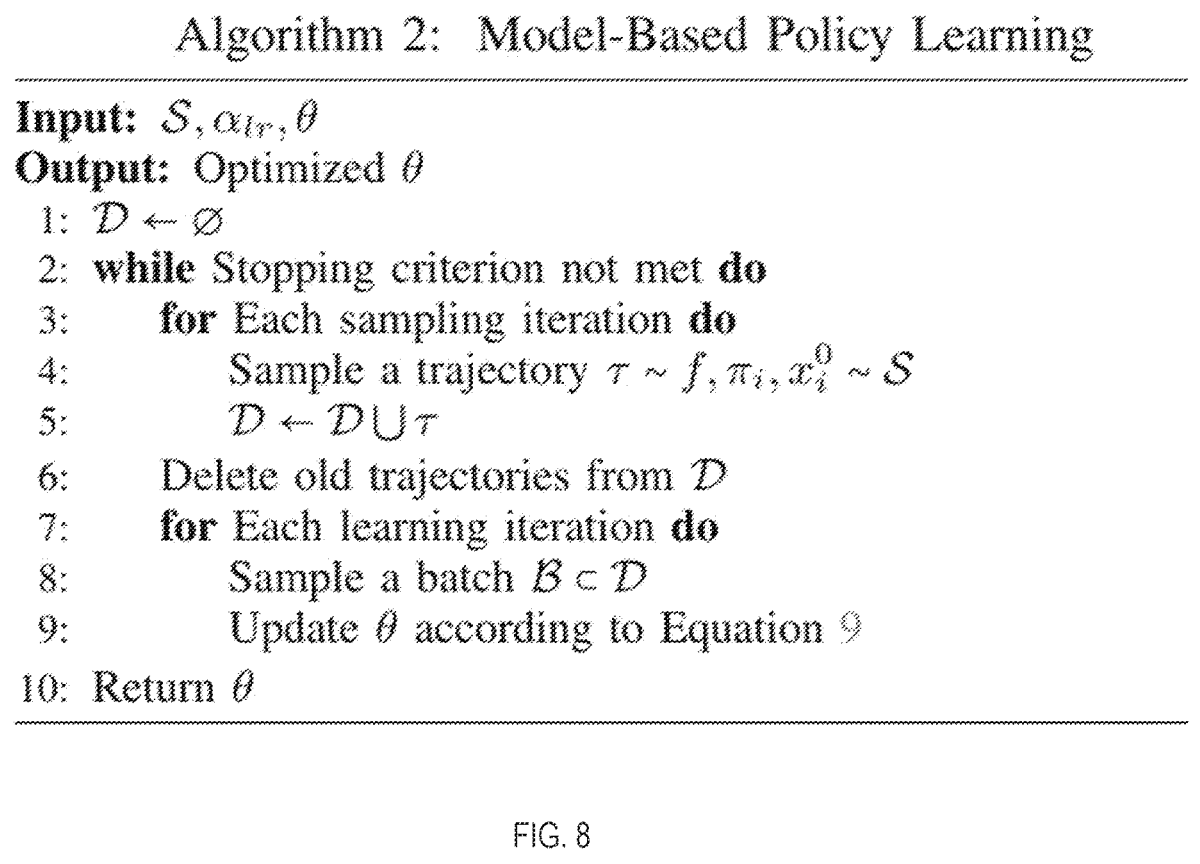

Algorithm 2: Model-Based Policy Learning

---

Input: $\mathcal{S}, \alpha_{lr}, \theta$

Output: Optimized $\theta$

1:   $\mathcal{D} \leftarrow \varnothing$

2:   while Stopping criterion not met do

3:       for Each sampling iteration do

4:           Sample a trajectory $\tau \sim f, \pi_i, x_i^0 \sim \mathcal{S}$

5:           $\mathcal{D} \leftarrow \mathcal{D} \cup \tau$

6:       Delete old trajectories from $\mathcal{D}$

7:       for Each learning iteration do

8:           Sample a batch $\mathcal{B} \subset \mathcal{D}$

9:           Update $\theta$ according to Equation 9

10:   Return $\theta$

| | Task | PPO | ORCA | Ours($H = 1$) | Ours($H = 32$) |
|---|---|---|---|---|---|
| 1310 | Navigation($M = 2$) | 5.223 | 0.775 | 0.488 | 0.390 |
| | Navigation($M = 3$) | 5.683 | 1.013 | 0.476 | 0.389 |
| | Navigation($M = 4$) | 5.510 | 1.812 | 0.500 | 0.400 |
| 1320 | Evacuation($M = 2$) | 3.991 | 0.932 | 0.631 | 1.286 |
| | Evacuation($M = 3$) | 2.881 | 0.973 | 0.721 | 0.820 |
| | Evacuation($M = 4$) | 2.597 | 0.925 | 0.714 | 0.907 |

1410  1420
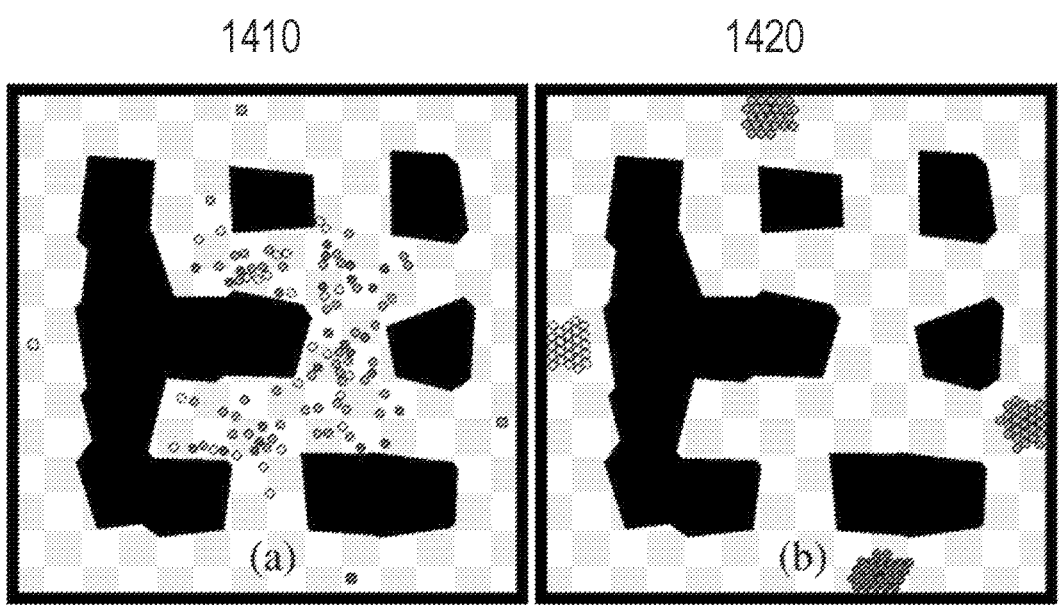
(a)  (b)
1431
1430  1440
1432
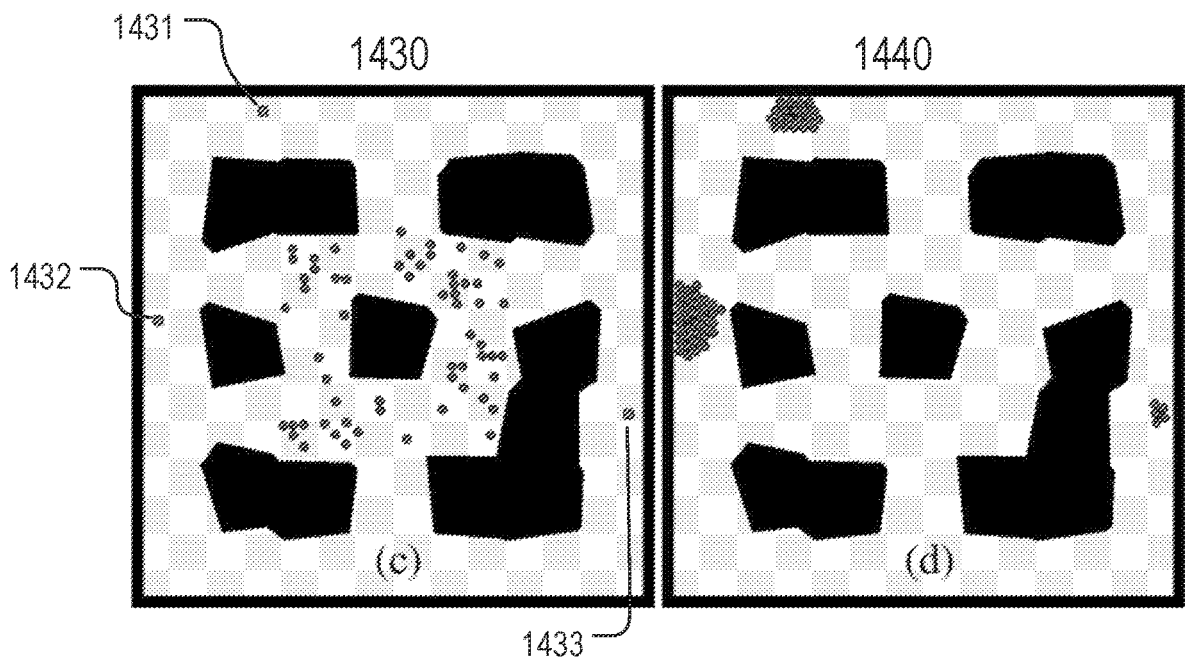
(c)  (d)
1433
FIG. 14

DIFFERENTIABLE LEARNING OF SCALABLE MULTI-AGENT NAVIGATION POLICIES

FIELD OF THE TECHNOLOGY

The present disclosure relates to multi-agent navigation, and in particular, to a differentiable learning of scalable multi-agent navigation policies.

BACKGROUND OF THE DISCLOSURE

Multi-agent navigation is used in many situations, wherein multiple agents navigates in an environment from their initial positions to their target positions. There are problems/issues associated with efficiently developing navigation policies so that multiple agents can navigate in a collision-free manner with each other and obstacles.

The present disclosure describes various embodiments for differentiable learning of scalable multi-agent navigation policies, addressing at least one of the issues/problems discussed above and achieving high efficiency. The present disclosure improves the technical field of multi-agent navigation.

SUMMARY

The present disclosure describes various embodiments of methods, apparatus, and computer-readable storage medium for differentiable learning of scalable multi-agent navigation policies.

According to one aspect, an embodiment of the present disclosure provides a method for navigating multiple objects from initial positions towards target positions. The method includes obtaining, by a device, an initial configuration and a target configuration, the initial configuration comprising initial positions of multiple objects, and the target configuration comprising target positions of the multiple objects. The device includes a memory storing instructions and a processor in communication with the memory. The method further includes inputting, by the device, the initial configuration and the target configuration into a neural network to generate a set of kernel parameters; constructing, by the device, a kernel-based divergence-free velocity field based on the set of kernel parameters; interpolating, by the device, the kernel-based divergence-free velocity field to extract predicted velocities of the multiple objects; generating, by the device, next positions of the multiple objects based on the predicted velocities according to a differentiable navigation algorithm; and iteratively taking, by the device until a condition is satisfied, next configuration as the initial configuration and feeding the next configuration into the neural network to begin next iteration, the next configuration comprising the next positions of the multiple objects.

According to another aspect, an embodiment of the present disclosure provides an apparatus for navigating multiple objects from initial positions towards target positions. The apparatus includes a memory storing instructions; and a processor in communication with the memory. When the processor executes the instructions, the processor is configured to cause the apparatus to: obtain an initial configuration and a target configuration, the initial configuration comprising initial positions of multiple objects, and the target configuration comprising target positions of the multiple objects; input the initial configuration and the target configuration into a neural network to generate a set of kernel parameters; construct a kernel-based divergence-free velocity field based on the set of kernel parameters; interpolate the kernel-based divergence-free velocity field to extract predicted velocities of the multiple objects; generate next positions of the multiple objects based on the predicted velocities according to a differentiable navigation algorithm; and iteratively take, until a condition is satisfied, next configuration as the initial configuration and feed the next configuration into the neural network to begin next iteration, the next configuration comprising the next positions of the multiple objects.

In another aspect, an embodiment of the present disclosure provides a non-transitory computer readable storage medium storing instructions. When the instructions are executed by a processor, the instructions cause the processor to: obtain an initial configuration and a target configuration, the initial configuration comprising initial positions of multiple objects, and the target configuration comprising target positions of the multiple objects; input the initial configuration and the target configuration into a neural network to generate a set of kernel parameters; construct a kernel-based divergence-free velocity field based on the set of kernel parameters; interpolate the kernel-based divergence-free velocity field to extract predicted velocities of the multiple objects; generate next positions of the multiple objects based on the predicted velocities according to a differentiable navigation algorithm; and iteratively take, until a condition is satisfied, next configuration as the initial configuration and feed the next configuration into the neural network to begin next iteration, the next configuration comprising the next positions of the multiple objects.

The above and other aspects and their implementations are described in greater detail in the drawings, the descriptions, and the claims.

BRIEF DESCRIPTION OF THE DRAWINGS

FIG. 2A is a flow diagram of an embodiment disclosed in the present disclosure.

FIG. 3A is a schematic diagram of an exemplary neural network disclosed in the present disclosure.

FIG. 3B is a schematic diagram of another exemplary neural network disclosed in the present disclosure.

FIG. 6 shows an algorithm of various embodiments in the present disclosure.

FIG. 7 shows an exemplary set of parameters of a neural network in various embodiments in the present disclosure.

FIG. 8 shows an algorithm of various embodiments in the present disclosure.

FIG. 14 shows results from various embodiments in the present disclosure.

DETAILED DESCRIPTION OF THE DISCLOSURE

Figure 1:
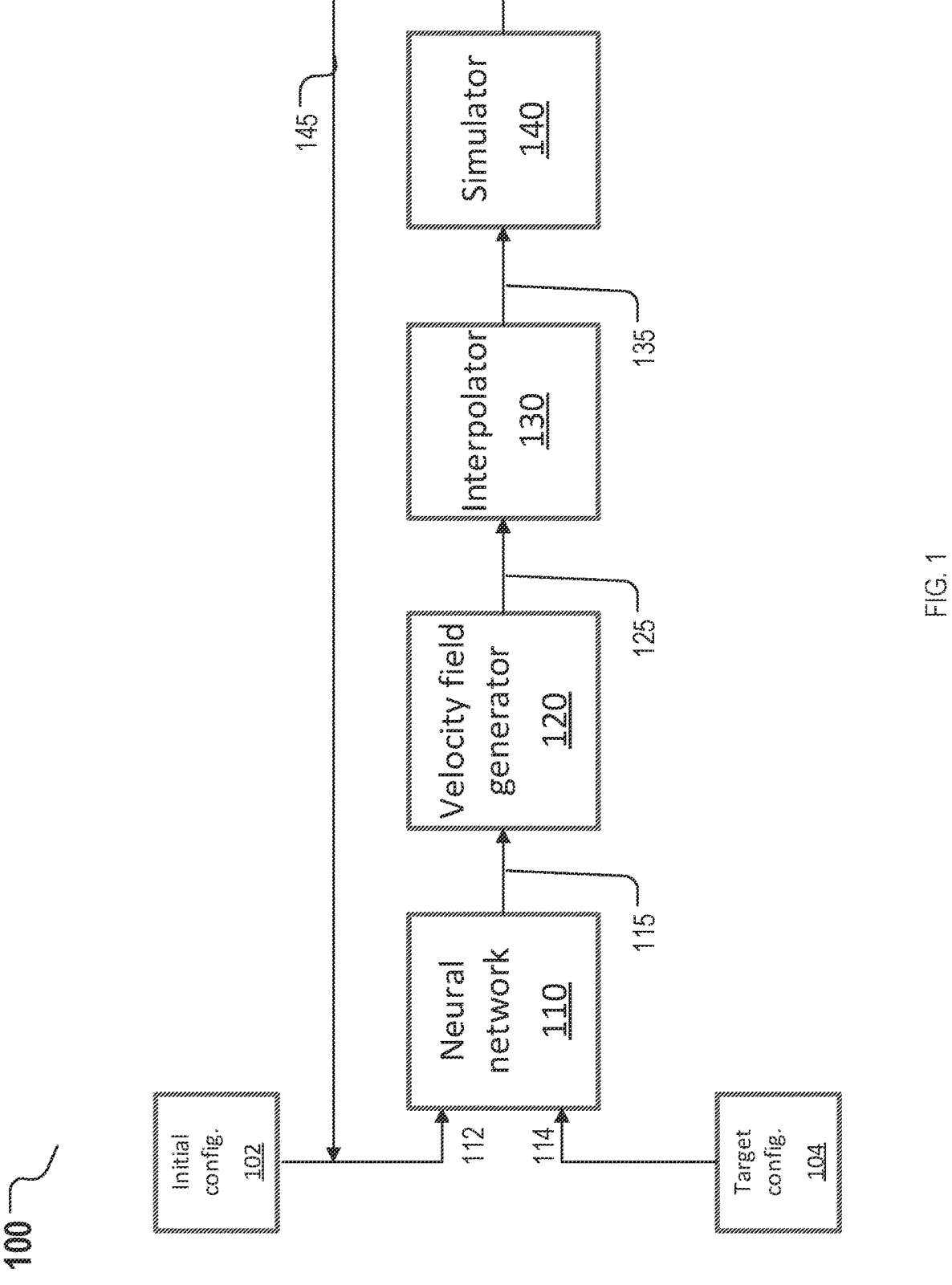
FIG. 1 is a schematic diagram of an embodiment disclosed in the present disclosure.

The invention will now be described in detail hereinafter with reference to the accompanied drawings, which form a part of the present invention, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes various embodiments of a differentiable learning of scalable multi-agent navigation policies.

In various situations, the navigation, scheduling, and/or controlling of multiple objects needs to be performed to achieve an efficient while collision-free result. For one example, in multi-agent navigation, one or more group of objects need to find routes from their current positions to their designated goal positions (or be called as target positions). For another example, in multi-agent excavation, one or more group of objects need to find route from their current positions to any one of more than one goal/target positions.

In various embodiments in the present disclosure, one or more object in the multi-agent situations may include one or more character in a video/computer game that is not fully controlled by a real human player, for non-limiting examples, a non-player character (NPC) or a computer played unit/object/character.

In various embodiments in the present disclosure, one or more object in the multi-agent situations may include one or more robot/vehicle in an automated facility that is not individually or fully controlled by a real human being, for non-limiting examples, robots or automated systems to retrieve/sort products in a warehouse, automated guided vehicles in an automated container port terminal, automated vehicles in a mass transit system, and/or automated trucks in an automated mining facility.

The present disclosure describes various embodiment of methods/systems for differentiable and scalable learning for collision-free multi-agent navigation policies, addressing at least of problems/issues associated with existing methods and/or improving multi-agent navigation efficiency and/or robustness. For one example, problems/issues associated with existing local navigation methods may include ill-defined gradient information. For another example, problems/issues associated with existing navigation policy may include a high offline training cost.

FIG. 1 shows a schematic diagram of a system 100 for performing a differentiable learning of scalable multi-agent navigation policies. The system 100 may include a portion or all of the following components: a neural network 110 including two inputs (112 and 114), a velocity field generator 120, an interpolator 130, and/or a simulator 140.

In some implementations, the two inputs of the neural network 110 may receive an initial configuration (initial config.) 102 and a target configuration (target config.) 104. The initial configuration may include multiple objects/agents.

In some implementations, the neural network 110 may include a plurality of neural network related parameters, which may represent a multi-agent navigation policy parameterization. The neural network may output a set of kernel parameters 115. The set of kernel parameters may specify a group of kernel functions, which individually represents a vector field with a particular structured motion. In some implementations, the velocity field generator 120 may receive the set of kernel parameters and construct a kernel-based divergence-free velocity field 125 based on the set of kernel parameters. In some implementations, the interpolator 130 may receive the kernel-based divergence-free velocity field and interpolate the kernel-based divergence-free velocity field to extract a plurality of predicted velocities 135 for the multiple objects. In some implementations, the simulator 140 may receive the plurality of predicted velocities for the multiple objects and generate next positions 145 of the multiple objects based on the predicted velocities according to a differentiable navigation algorithm. In some implementations, a next configuration is generated based on next positions of the multiple object and is fed into the neural network 110 to start next iteration. The iteration may continue until a condition is satisfied.

FIG. 2A shows a flow diagram of a method 200 for performing a differentiable learning of scalable multi-agent navigation policies. The method 200 may include a portion or all of the following steps: step 210: obtaining an initial configuration and a target configuration, the initial configuration comprising initial positions of multiple objects, and the target configuration comprising target positions of the multiple objects; step 220: inputting the initial configuration and the target configuration into a neural network to generate a set of kernel parameters; step 230: constructing a kernel-based divergence-free velocity field based on the set of kernel parameters; step 240: interpolating the kernel-based divergence-free velocity field to extract predicted velocities of the multiple objects; step 250: generating next positions of the multiple objects based on the predicted velocities according to a differentiable navigation algorithm; and/or step 260: iteratively taking, until a condition is satisfied, next configuration as the initial configuration and feeding the next configuration into the neural network to generate another positions of the multiple objects, the next configuration comprising the next positions of the multiple objects.

Figure 2B:
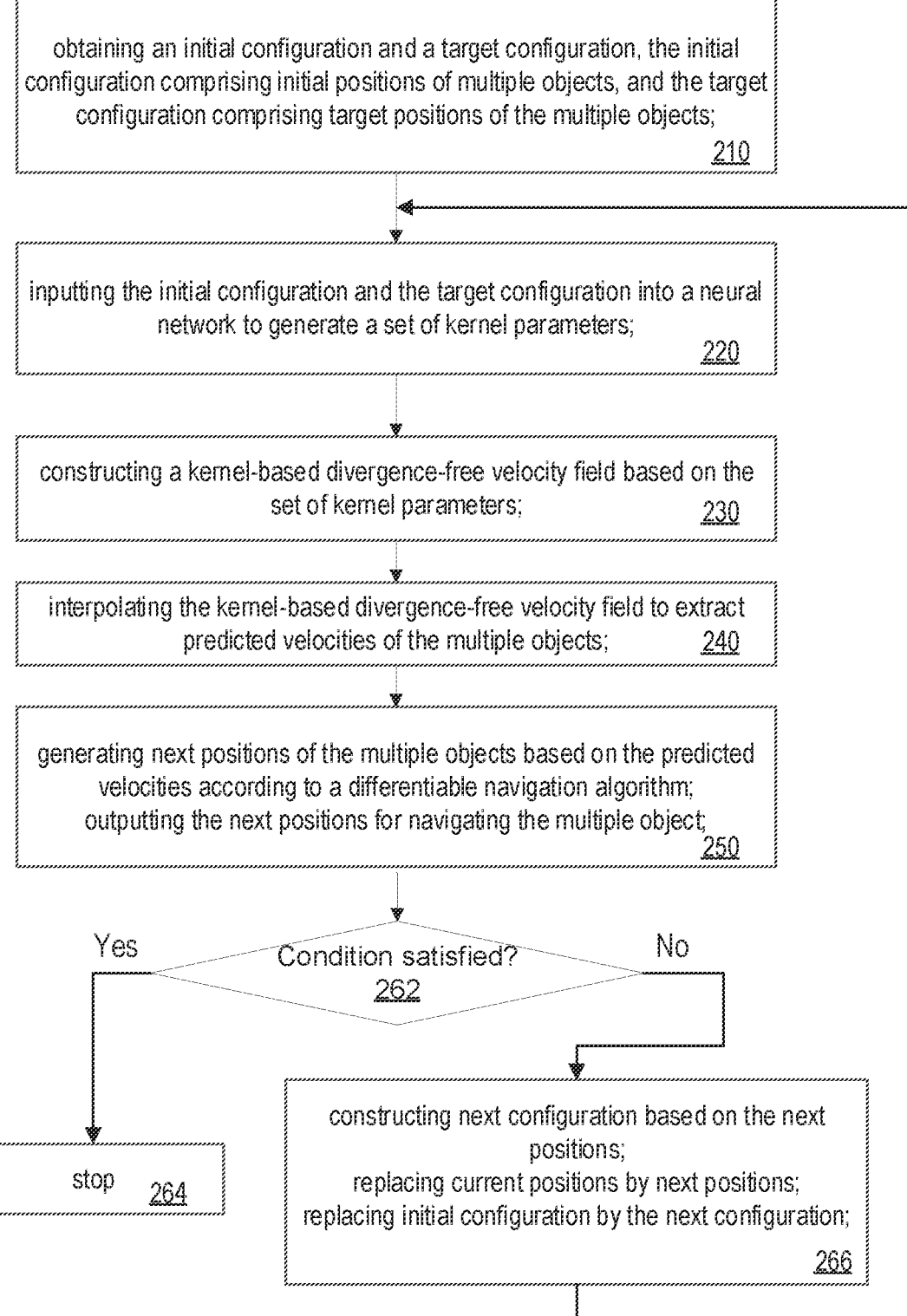
FIG. 2B is a flow diagram of another embodiment disclosed in the present disclosure.

In some implementations, referring to FIG. 2B, the step 250 may further include outputting the next positions for navigating the multiple objects to move from their current positions to the next positions. In some implementations, the step 260 may include a portion or all of the following steps: step 262, determining whether a condition is satisfied; step 264, in response to determining that the condition is satisfied, stop/exit the iterations; and/or step 266, constructing the next configuration based on the next positions of the multiple objects, replacing current positions by the next positions, and/or replacing the initial configuration by the next configuration. The step 266 may include begin next iteration by starting with the step 220.

In some implementations, a series of next positions generated by the method may be used to control/navigate one or more non-player characters in a game, may be used to control/navigate one or more robots or automated systems in a warehouse, may be used to control/navigate automated guided vehicles in an automated container port terminal, may be used to control/navigate automated vehicles in a mass transit system, or may be used to control/navigate automated trucks in an automated mining facility.

In some implementations, the condition in step 260 or 262 may include one or a combination of the following: a number of iterations, a target function value calculated based on the next positions and target positions of the multiple objects, a time-duration of computing all iterations, a trigger event by a user (e.g., a click of a "stop" button).

Referring to step 210, the initial configuration may include a set of data or may be represented by an image, showing the initial positions of the multiple objects; and the target configuration may include a set of data or may be represented by a target image, showing target positions of the multiple objects. In some implementations, there may be at least one obstacle in the environment so that the multiple object need to avoid during navigation. The obstacle may have a regular or irregular shape or size, for example, the obstacle may include a tree, a building, a fence, and the like, which collectively form an obstacle configuration. When there is obstacle in the environment, the initial configuration and the target configuration may include a same obstacle configuration.

In some implementations, the target configuration comprises at least one target position for each object. In some situations such as in an agent navigation, each object has a single target position, for example, each of the multiple objects have a single particular designated goal position. In some situations such as in an agent excavation, each object may have more than one target positions, for example, each of the multiple objects may navigate to one of a plurality of designed goal positions.

Referring to FIG. 3A, the neural network 110 may include a first convolutional neural network (CNN) 310, a second CNN 320, and a multiple layer perceptron (MLP) 330. Referring to step 220, the initial configuration may be input as a first input 302 into the first CNN to generate first features 312; the target configuration may be input as a second input 304 into the second CNN to generate second features 314; combined features 315 may be generated based on the first features and the second features, and the combined features may be input as an input into the MLP to generate the set of kernel parameters 335. In some other implementations, the neural network 110 may include one or more neural networks other than CNN and/or MLP.

In some implementation, combining the first features and the second features may include concatenating, summing, averaging, or weighted averaging the first features and the second features to obtain the joint features (or combined features).

In some implementations as shown in FIG. 3B, there may be a single CNN 340 rather than two CNNs. The initial configuration may be input as a first input 302 into the CNN 340; and the target configuration may be input as a second input 304 into the CNN 340. The CNN 340 generates joint features (or combined features) 315, and the combined features may be input as an input into the MLP to generate the set of kernel parameters 335.

The neural network comprises a set of neural-network parameters indicating a navigation policy, and the neural network may be pretrained according to a training process as discussed in the present disclosure.

Referring to step 230, the method may include constructing a kernel-based divergence-free velocity field based on the set of kernel parameters; constructing a velocity field by accumulating a plurality of kernel functions based on the set of kernel parameters; rasterizing the velocity field onto a dense grid; and/or projecting the rasterized velocity field according to a divergence-free condition to obtain the kernel-based divergence-free velocity field.

Referring to step 240: the predicated velocities for the multiple objects may be extracted by interpolating the kernel-based divergence-free velocity field based on the current positions of the multiple objects, respectively. During the first iteration, the current positions of the multiple objects may be the initial positions of the multiple objects; and during the second or following iterations, the current positions of the multiple objects may be the next positions generated from the previous iteration.

Referring to step 250: the method may include constructing a current total-energy function of the multiple objects based on the predicted velocities and current positions of the multiple objects; in each iteration before a stopping condition is satisfied: obtaining a predicted navigation-vector for each object based on the current total-energy function, determining a portion of the predicated navigation-vector as a finalized navigation-vector for each object, generating next position for each object based on the finalized navigation-vector and the current position for each object, and/or constructing a next total-energy function of the multiple objects based on the predicted velocities and the next positions for multiple objects and using the next total-energy function as the current total-energy function in next iteration. In some implementations, during each iteration, every trajectory of the multiple objects is collision-free among each other and the next total-energy function is smaller than the current total-energy function. In some implementations, the stopping condition comprises a gradient of the current total-energy function for each object being equal to or smaller than a threshold.

Referring back to FIG. 1, the neural network 110 in the system 100 may be pre-trained for collision-free multi-agent navigation policies, and the trained neural network parameters may represent the trained and optimized collision-free multi-agent navigation policies. In some implementations, the neural network is pre-trained with a plurality of system iterations. In each iteration before a stopping condition is satisfied, the neural network is pre-trained by obtaining a plurality of sampling iterations from the neural network by sampling a plurality of initial configurations, generating an overall reward function based on a portion of the plurality of sampling iterations, and updating the neural network based on gradient information of the overall reward function. During updating the neural network, the neural network parameters are updated based on gradient information of the overall reward function, i.e., maximizing the overall reward function.

In some implementations, the stopping condition comprises at least one of the following: the overall reward function is bigger than a first threshold, or a difference of the overall reward functions from one iteration to next iteration is smaller than a second threshold.

In some implementations, the overall reward function may be replaced by a overall loss function. The training is performed to update the neural network to minimize the overall loss function. The stopping condition may include at least one of the following: the overall loss function is smaller than a first threshold, or a difference of the overall loss functions from one iteration to next iteration is smaller than a second threshold.

In some implementations, during training, each of the plurality of initial configurations may include different number of multiple objects and/or different initial positions. In some implementations wherein there is obstacle configuration, during training, each of the plurality of initial configurations may include the same obstacle configuration.

Figure 4:
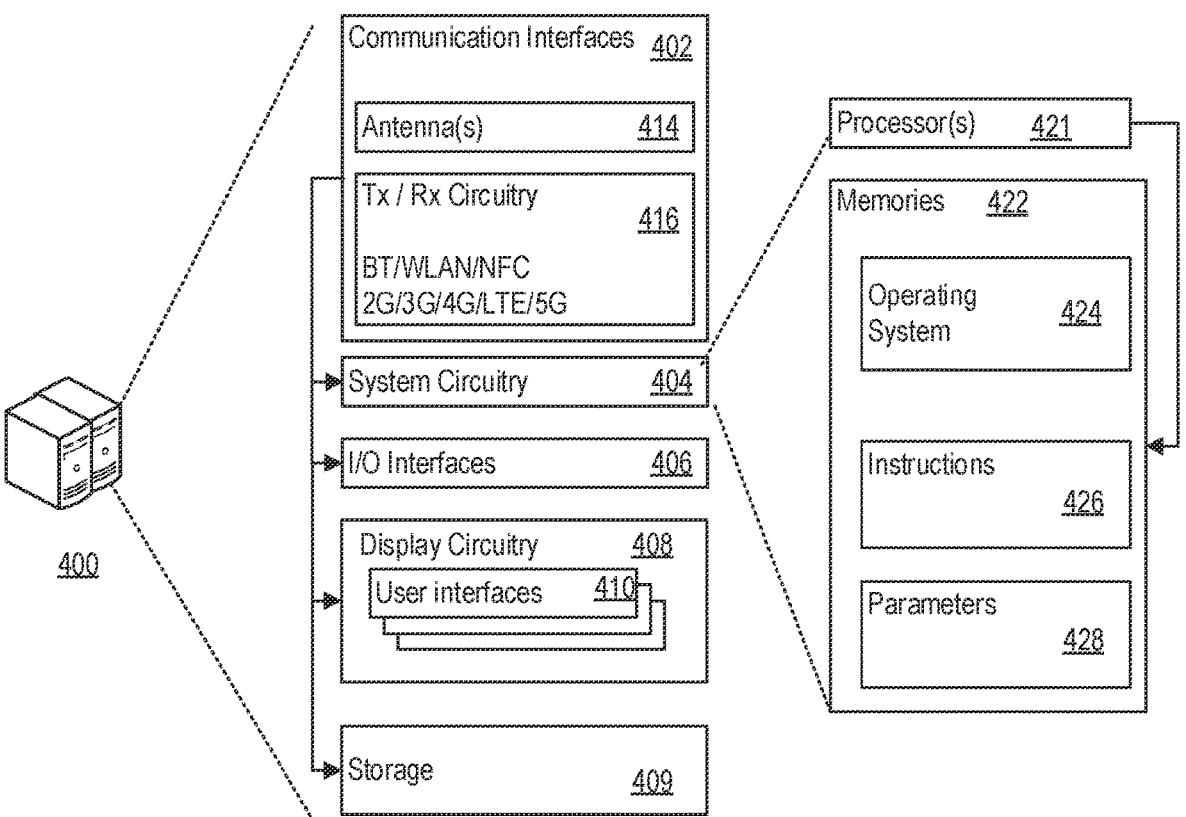
FIG. 4 is a schematic diagram of an electronic device disclosed in the present disclosure.

FIG. 4 shows an example of an electronic device 400 to implement one or more method described in the present disclosure. In one implementation, the electronic device 400 may be at least one of a computer, a server, a laptop, or a mobile device. In another implementation, the electronic device 400 may be a set of electronic devices comprising at least one of one or more computing server, one or more data server, one or more network server, one or more terminal, one or more laptop, and/or one or more mobile device.

The electronic device 400 may include communication interfaces 402, a system circuitry 404, an input/output interfaces (I/O) 406, a display circuitry 408, and a storage 409. The display circuitry may include a user interface 410. The system circuitry 404 may include any combination of hardware, software, firmware, or other logic/circuitry. The system circuitry 404 may be implemented, for example, with one or more systems on a chip (SoC), application specific integrated circuits (ASIC), discrete analog and digital circuits, and other circuitry. The system circuitry 404 may be a part of the implementation of any desired functionality in the electronic device 400. In that regard, the system circuitry 404 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 410. The user interface 410 and the inputs/output (I/O) interfaces 406 may include a graphical user interface, touch sensitive display, haptic feedback or other haptic output, voice or facial recognition inputs, buttons, switches, speakers and other user interface elements. Additional examples of the I/O interfaces 406 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 4, the communication interfaces 402 may include wireless transmitters and receivers ("transceivers") and any antennas used by the transmitting and receiving circuitry of the transceivers. The communication interfaces 402 may also include wireline transceivers, which may provide physical layer interfaces for any of a wide range of communication protocols, such as any type of Ethernet, data over cable service interface specification (DOCSIS), digital subscriber line (DSL), Synchronous Optical Network (SONET), or other protocol. The communication interfaces 402 may include a Radio Frequency (RF) transmit (Tx) and receive (Rx) circuitry 416 which handles transmission and reception of signals through one or more antennas 414. The communication interface 402 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 402 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

The system circuitry 404 may include hardware, software, firmware, or other circuitry in any combination. The system circuitry 404 may be implemented, for example, with one or more systems on a chip (SoC), application specific integrated circuits (ASIC), microprocessors, discrete analog and digital circuits, and other circuitry. For example referring to FIG. 4, the system circuitry 404 may include one or more processors 421 and memories 422. The memory 422 stores, for example, an operating system 424, instructions 426, and parameters 428. The processor 421 is configured to execute the instructions 426 to carry out desired functionality for the electronic device 400. The parameters 428 may provide and specify configuration and operating options for the instructions 426. The memory 422 may also store any BT, WiFi, 3G, 4G, 5G or other data that the electronic device 400 will send, or has received, through the communication interfaces 402. In various implementations, a system power for the electronic device 400 may be supplied by a power storage device, such as a battery or a transformer.

The storage 409 may be used to store various initial, intermediate, or final data. In one implementation, the storage 409 may be integral with a database server. The storage 409 may be centralized or distributed, and may be local or remote to the electronic device 400. For example, the storage 409 may be hosted remotely by a cloud computing service provider.

The present disclosure describes various embodiments, which may be implemented, partly or totally, on the one or more electronic device described in FIG. 4.

The present disclosure describes various embodiments for differentiable and scalable learning methods and systems for collision-free multi-agent navigation policies. Various embodiments combine several desirable features. In some implementations, a differentiability analysis on two local navigation algorithms, Optimal Reciprocal Collision Avoidance (ORCA) and Implicit Crowds (IC), may be conducted, and the two local navigation algorithms may lead to ill-defined gradient information.

Various embodiments in the present disclosure may utilize a new algorithm based on a weaker definition of collision-free, with well-defined gradient information. A compact and scalable parameterization of navigation policies may be derived. Inspired by continuum multi-agent modeling, various embodiments may include controling the agents using a boundary-aligned, divergence-free velocity field. Ideas from vortex-based sparse velocity representation may be used and the velocity field may be parameterized using a sparse set of Lagrangian kernel functions.

By using the parameters of kernel functions as the low-dimensional action space, the navigation policy in various embodiments may control an arbitrary number of agents with an invariant representation. Action space representation in various embodiments may further improve the artificial intelligence (AI) explainability because the kernel functions inherently summarize the key information of the underlying velocity field. Finally, the global information may be injected into the control policy by using image-based features automatically identified using one or more Convolutional Neural Network (CNN).

The present disclosure may address at least one of the problems/issues associated with some implementations, for example, almost all existing navigation policy search algorithms incur a high offline training cost: the average reinforcement learning (RL) training cost may be around 10 hours on average. The high training cost may lead to a linearly increasing inference cost. Indeed, these learned policies may be deployed on a per-agent basis. The present disclosure including differentiable learning methods may allow faster training and/or may save inference costs by deploying a single policy for all the agents.

In various embodiments, multi-agent collision-free navigation tasks may be formulated as the following. A group of N holonomic agents may be assumed, in which the i-th agent is located at $$x_i^t \in \mathbb{R}^2$$

at time instance t, wherein N includes a positive integer, and i includes non-negative integer. All the agents are assumed to have the same spherical shape with a unified radius of r. A set of M static obstacles are introduced, with the j-th obstacle taking up volume $o_j \subset \mathbb{R}^2$, wherein j includes non-negative integer. The solution to the multi-agent navigation is to search for a discrete trajectory over a horizon of T steps, such that any pair of two agents do not overlap at any time instance, i.e.

$$\forall \alpha \in [t, t+\Delta t] : \begin{cases} dist(x_i^\alpha, x_j^\alpha) \geq 2r, \\ dist(x_i^\alpha, o_j) \geq r \end{cases} \tag{1}$$

wherein $\Delta t$ is the timestep size. Since the agents are assumed to be holonomic, their dynamics are dominated by collision-free constraints and the control signal. A common choice represents the control signal of $x_i$ as the preferred moving velocity, denoted as $$v_i^t.$$

The next position $$x_i^{t+\Delta t}$$

can then be predicted using a multi-agent simulation function (f):

$$f(x_i^t, v_i^t) = x_i^{t+\Delta t}.$$

The goal of navigation is encoded in a reward function (R)

$$R(x_i^t)$$

summed over all the agents and time instances. A navigation policy for the i-th agent could be modeled as a function $$\pi_i(o, \theta) = v_i^t,$$

where o is the observation of the local and global features around the agent, and $\theta$ is the decision variables that parameterizes $\pi_i$. The goal of multi-agent navigation is then formulated as the following Markov Decision Process (MDP):

$$\underset{\theta}{\text{argmax}} \mathbb{E}_{T_i \sim (f, \pi_i), x_j^0 \sim S} \left[ \sum_{x_i^t \in T_i} \gamma^t R(x_i^t) \right], \tag{2}$$

wherein argmax is the function of the arguments of the maxima, which are the points, or elements, of the domain of some function at which the function values are maximized, S is the initial distribution of agent configurations, $\tau_i$ is the trajectory of $x_i$ generated by the state transition function f and the policy $\pi_i$, and $\gamma$ is the discount factor. Variants of above optimization with different choices of f, R, $\pi_i$ and algorithms for solving the stochastic optimization may be considered, and some choices are described in more detail below.

Figure 5:
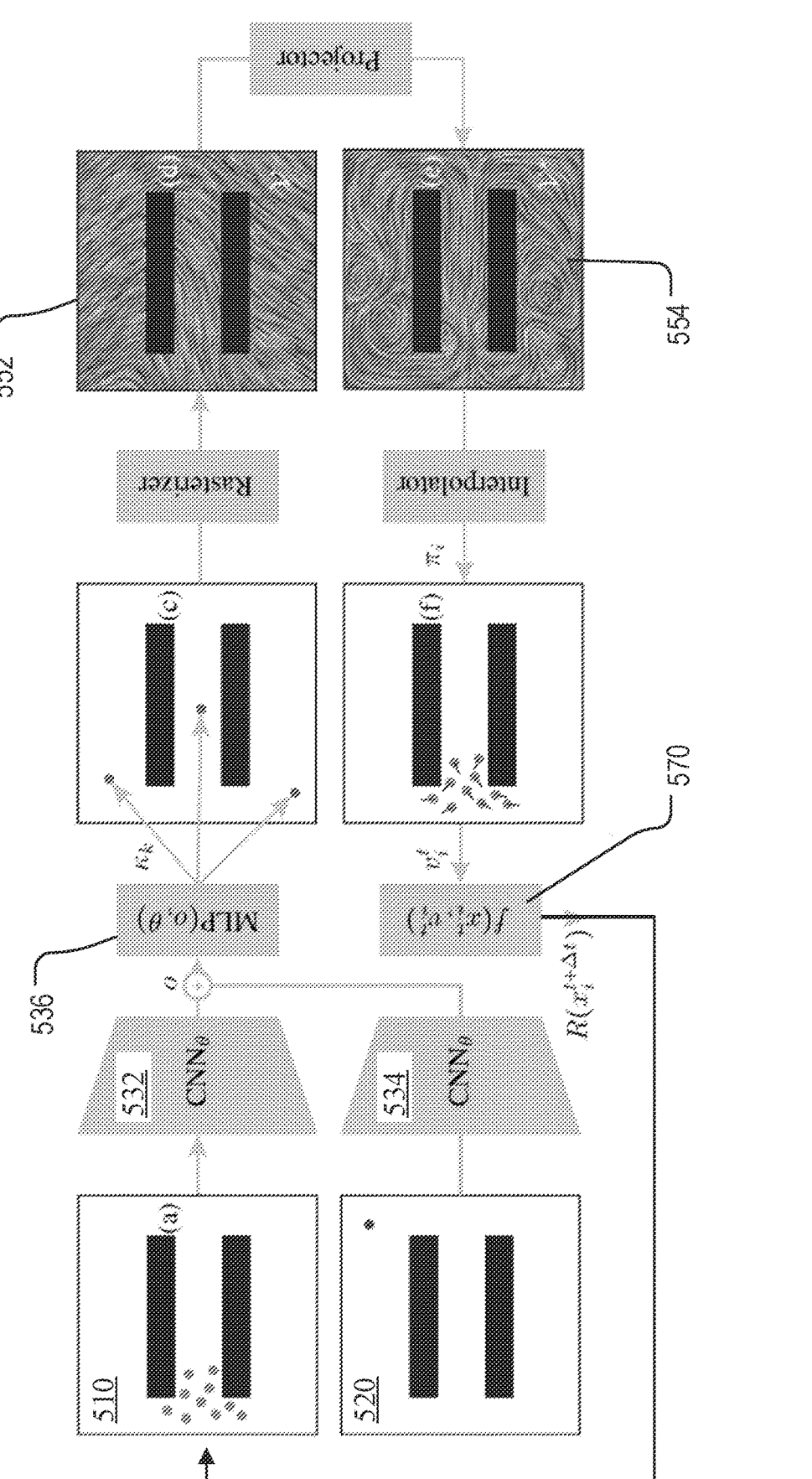
FIG. 5 is a schematic diagram of an embodiment in the present disclosure.

FIG. 5 shows a schematic diagram of an embodiment of the centralized policy representation for both training and test time. The policy takes two images (510 and 520) as inputs, wherein one image is the global environmental map (510) and another image is the target configuration (520). Latent features are extracted using two CNNs (532 and 534) to form the observation (o). The kernel estimator is a fully-connected MLP (536) that estimates the parameters of a small set of velocity kernels $\kappa_k$. The velocity field (V) (552) generated by these kernels is extracted by a rasterizer. This velocity field is not divergence-free, and the divergence-free component (V*) (554) is extracted via a projector. The final preferred moving directions $\pi_i$ are then extracted by interpolating (V*). The interpolated control signal is fed into the differential collision-free navigation simulation function (f) (570). The new agent locations are feed into the reward signal $$R(x_i^{t+\Delta t}).$$

Finally, the new agent locations may be also feed into the CNN (532) to start next iteration.

The present disclosure describes various embodiments including differentiable and scalable policy search algorithm as outlined in FIG. 5. The various embodiments include novel designs of functions f, R, and $\pi_i$, such that the gradient information may be brought all the way back through the entire trajectory $\tau$ to efficiently update $\theta$. The various embodiments may further allow the use of a small network to control an arbitrary number of agents in a centralized manner.

Differentiable Multi-Agent Simulator

Various embodiments in the present disclosure may formulate the agent simulation as an implicit time integration problem, identifying the predicted agent position as the minimizer of the following energy:

$$x_i^{t+\Delta t}, \dots, x_N^{t+\Delta t} \triangleq \underset{x_1, \dots, x_N}{\operatorname{argmin}} E(x_i, x_i^t, v_i) E(x_i, x_i^t, v_i) \triangleq \tag{3}$$

$$\sum_i \frac{1}{2\Delta t^2} \|x_i - x_i^t - v_i^t \Delta t\|^2 + \sum_{i \neq j} U(x_i, x_j),$$

wherein $U(x_i, x_j)$ is a stiff potential function defined as:

$$U(x_i, x_j) \triangleq \frac{1}{\|x_i - x_j\| + \epsilon}, \tag{50}$$

which tends to infinity when $\|x_i, x_j\| + \epsilon \to 0$. By using a sufficiently small $\epsilon$ and maintaining the solution in the feasible domain via a line-search, $$x_i^{t+\Delta t}$$

are guaranteed to satisfy Equation 1 at the time instance $t+\Delta t$. Time integrating the dynamic system with the potential function (U) may suffer from stability issues because U may generate extremely large forces. Therefore, the implicit scheme may be used and the time integrator may be reformulated as an optimization Equation 3. This method is way more amenable to a differentiable system. By not fixing the decision variables in the constraint, the gradient information may be readily propagated to faraway agents.

In some implementations, satisfying Equation 1 at $t+\Delta t$ alone may not be enough, as Equation 1 should be satisfied at any time instance $\alpha \in [t, t+\Delta t]$. To resolve this, the straight-line assumption may be replaced with the following weaker assumption.

In some implementations, a first assumption (Assumption I) may include agents $$x_i^\alpha$$

are collision-free at any $\alpha \in [t, t+\Delta t]$ if there exists a piecewise linear trajectory satisfying Equation 1.

The weaker assumption may be more difficult to be deployed on a physical hardware because the control signal needs to change multiple times within a single control loop, but this is less important during the training phase. Assumption I is amenable to an optimization algorithm equipped with a line-search. When a step generated by a line-search is considered as a linear sub-trajectory, the entire trajectory generated by the optimizer of Equation 3 is exactly piecewise linear. As long as the linear sub-trajectory generated by each line-search step is collision-free, the entire trajectory satisfies Equation 1 using the standard potential energy U. The following locally supported U may be used:

$$U(x_i, x_j) = \frac{1}{2} \sum_{l=1}^\infty l^3 \min\left(0, \|x_i - x_j\| - \frac{d_0}{l^{\frac{1}{4}}}\right)^2, \tag{4}$$

wherein $d_0$ is the support range parameter. Equation 4 may be computed by summing up a finite number of terms and all other terms beyond a certain 1 are zero. Due to the finite support of U, the double summation in the energy function (E) may be computed efficiently using local neighborhood search with a radius of $2r+d_0$.

FIG. 6 shows a summarized algorithm of the above as Algorithm 1: Differentiable Crowed Simulation. The gradient information may be computed using the implicit function theorem as:

$$\frac{\partial x^{t+\Delta t}}{\partial x^t} = -\left[\frac{\partial^2 E}{\partial x^{t+\Delta t^2}}\right]^{-1} \frac{\partial^2 E}{\partial x^{t+\Delta t} \partial x^t}$$

$$\frac{\partial x^{t+\Delta t}}{\partial v^t} = -\left[\frac{\partial^2 E}{\partial x^{t+\Delta t^2}}\right]^{-1} \frac{\partial^2 E}{\partial x^{t+\Delta t} \partial v^t},$$

wherein x and v without subscript are denoted as a vector concatenating x and v of all agents.

Kernel-Based Policy Parameterization

Aside from a differentiable navigation simulator, one factor (may be a key factor) to efficient and robust training lies in a compact parameterization of policy $\pi_i$. Indeed, a redundant parameterization is prone to over-fitting or requires an excessively large dataset or amount of explorations. A policy parameterization may be inspired by the continuum model of crowd motions, wherein these methods model agents as infinitesimal material particles immersed in a velocity field denoted by V. The collision-free constraints may be approximated by the requirement that V is divergence-free or volume-preserving, i.e., $\nabla \cdot v = 0$. Such representation has two advantages. First, divergence-free constraints are linear, which can be efficiently enforced by fast linear system solvers. Without using learnable parameters, divergence-free constraints can already prevent a considerable portion of local, inter-agent collisions or boundary penetrations. As a result, a neural network policy could focus on solving high-level tasks. Second, a divergence-free vector field can be sparsely represented as a set of kernel functions. Indeed, a vector field is smooth except at a set of singular points.

In some implementations, in order to represent a centralized and scalable control policy, a sparse representation of the velocity field may be learned. It may be assumed that there are K kernel functions denoted as $\kappa_k(p, \phi)$ with k=1, ..., K, where $p \in \mathbb{R}^2$ is a spatial location and $\phi$ is a small set of parameters.

In some implementations, two kinds of kernel functions may be effective in generating structured motions of immersed particles. Rotating motions are generated by the following kernel:

$$\kappa(p, \phi) \triangleq \beta \begin{pmatrix} 0 & -1 \\ 1 & 0 \end{pmatrix} (p - p_0) \exp(-\alpha \|p - p_0\|^2) \phi \triangleq (\alpha\beta p_0),$$

while directional motions can be generated by defining:

$$\kappa(p, \phi) \triangleq d \exp(-\alpha \|p - p_0\|^2) \phi \triangleq (\alpha d p_0). \tag{5}$$

Here $\beta$ and d control the strength of swirl and motion velocity, respectively. Both functions are called kernel functions that attenuate quickly with distance from a kernel center $p_0$ with a parameter $\alpha$.

In some implementations, since robots/agents are mostly moving along a fixed direction during navigation tasks, only directional kernels are selected. It is speculated that curl kernels could be useful in other tasks as well. The velocity field can then be defined as an accumulation of the K kernels:

$$V(p) \triangleq \sum_{k=1}^{K} \kappa(p, \phi_k). \tag{6}$$

In practice, the accumulated velocity field V is then rasterized onto a dense grid. To further enforce the divergence-free condition, a discrete Poisson's equation may be solved using a staggered grid discretization, which is denoted as:

$$V^* \triangleq \underset{V^*}{\operatorname{argmin}} \frac{1}{2} \int_x \|V^*(p) - V(p)\|^2 \text{ s.t. } \nabla \cdot V^* = 0, \tag{7}$$

wherein the Dirichlet boundary condition that the normal velocity on the boundary is zero may be always enforced, and argmin denotes a function of the arguments of the minimum which are the points, or elements, of the domain of some function at which the function values are minimized. Equation 7 involves solving a large linear system.

In some implementations, for a fixed obstacle setup, the left-hand side of the above linear system is fixed and can be pre-factorized. As a result, solving for V* at both training and inference time can be very efficient.

In some implementations, the preferred velocity of each agent is derived by interpolating V* at $$x_i^t.$$

As a remarkable feature, all the above derivations do not involve any learnable parameters and only expose a small number of kernel parameters $\phi_k$ to be determined.

In some implementations, a fully connected neural network is used to infer $\phi_1, \ldots, \phi_K$ using a small Multi-Layer Perceptron (MLP) from observations:

$$MLP(o, \theta) = (\phi_1 \ \ldots \ \phi_K). \tag{8}$$

In summary, the definition of the compact policy parameterization of $\pi_i$ combines Equations 5, 6, 7, and 8. For non-limiting example, the MLP may output less than 100 parameters to define an entire velocity field, which could be used to control an arbitrary number of agents without re-training.

In some implementations, the policy is centralized, so the observation must contain global information, which could be the global map. The policy may achieve the best performance using two global maps, one encoding the obstacle with agent configurations and the other encoding the target configuration. The observation consists of features extracted from these two images using two CNNs of the same structure. FIG. 7 shows a non-limiting example of the neural network architecture for the CNNs and MLP.

Policy Search Algorithm

In various embodiments, as long as the reward signal (R) is differentiable, the learning architecture could bring gradient information through each and every component to facilitate self-supervised, model-based learning. To train robust control policies, the learning algorithm need to be fed with enough trajectories sampled according to the current functions f and $\pi_i$. To stabilize training, a replay buffer similar to Q-learning may be maintained, but instead of storing the entire transition tuple $$\langle x_i^t, v_i^t, x_i^{t+\Delta t}, R(x_i^{t+\Delta t}) \rangle,$$

only the current state $$x_i^t$$

need to be stored. During each iteration of training, a batch (B) of $$x_i^t$$

may be sampled and R may be optimized over a receding horizon of H timesteps, i.e.:

$$\theta \leftarrow \theta + \alpha_{lr} \nabla_\theta \sum_{x_i^t \in B} \sum_{h=1,\dots,H} \gamma^t R(x_i^{t+h\Delta t}). \qquad (9)$$

The replay buffer is constructed by sampling an initial configuration $$x_i^0 \in S$$

and running the current policy $\pi_i$ to generate trajectories $\tau$. To minimize the distribution bias between the replay buffer and the policy, only a set of the latest trajectories may be kept. FIG. 8 shows a summarized algorithm based on the above exemplary method as Algorithm 2: Model-based Policy Learning.

In one non-limiting exemplary embodiment, the neural network policy may be implemented using PyTorch and the differentiable simulator in C++ as a custom network layer interfaced with PyTorch. One computational bottleneck is the divergence-free projection, for which the lefthand side matrix may be pre-factorized on a central processing unit (CPU) before training, and then linear systems may be solved on a graphics processing unit (GPU) using CuPy. All experiments may be performed on a desktop machine with a CPU (e.g., i7-10750H) and one or more GPU (e.g., Nvidia GTX-1080). All the forward-backward gradient propagations are performed on the GPU, except for the differentiable simulator on CPU. In theory, the method may learn to solve any navigation task as long as the reward function is differentiable. The method may be evaluated on two tasks, partially labeled navigation and evacuation. The method with the model-free RL baseline are compared where the policy may be trained using the same reward function. All the training uses maze-like environments with randomized obstacle shapes, and parameters r=1 unit, $d_0$=10 unit, $\Delta$=0.1 s, $\alpha_{lr}$=3e−5, and $\gamma$=0.98 are used. A trajectory may be terminated after 128 timesteps. With a stable agent simulator allowing a large timestep size $\Delta t$, short trajectories are sufficient for agents to reach their goals, which significantly boosts training speed. 128 timesteps may be used for evacuation task and 256 for others. A minimal replay buffer size is used, i.e., D only stores the latest sampled trajectory, and a single epoch after sampling one trajectory may be trained.

Figure 9:
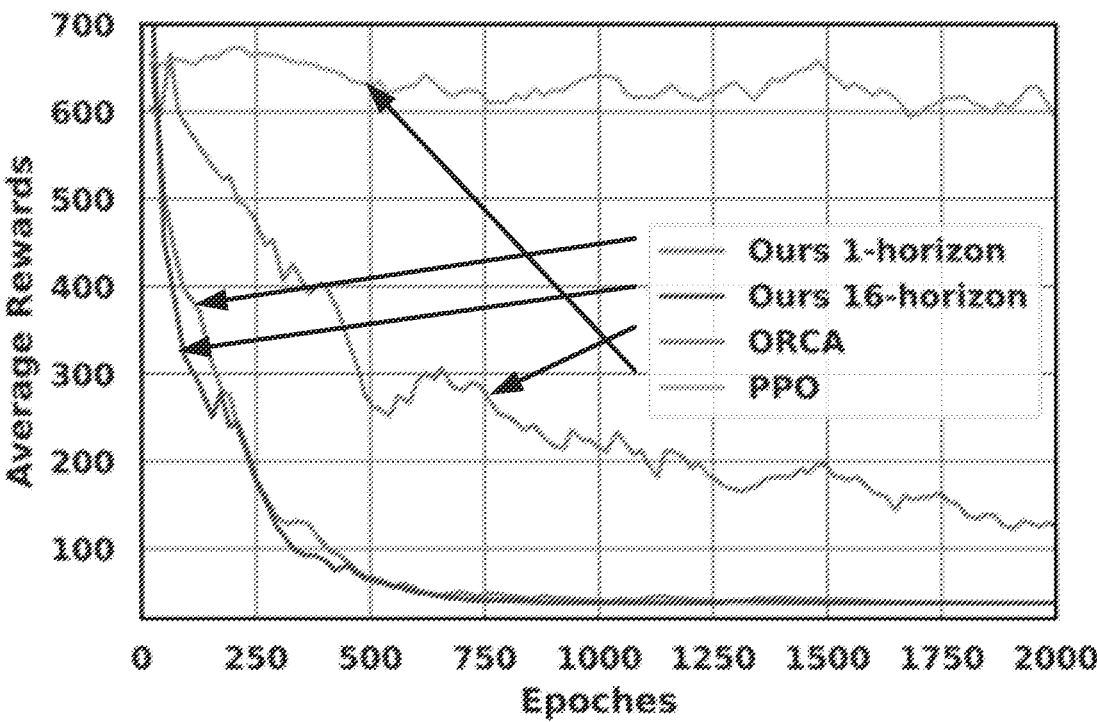
FIG. 9 shows comparison results with various embodiments in the present disclosure.

FIG. 9 shows comparison results. On the navigation task, the convergence history of the method with a horizontal number (H) H=1 and H=16, the proximal policy optimization (PPO) baseline, and a variant of the method using optimal reciprocal collision avoidance (ORCA) are evaluated to provide gradient information. The performance is measured by the average ultimate agent-to-region distance, over a fixed subset of unseen, testing problems.

Partially Labeled Navigation Task

For a non-limiting example, the partially labeled navigation task is shown in 1410 and 1420 in FIG. 14. It is assumed that there are M=3 groups of agents, each of which has a distinct goal position. All the groups use the same control policy. Each policy takes three images: 1) the agent positions of the current group, 2) the agent positions of the M−1 other groups, and 3) the target configuration. A single CNN may be used to process all three images by sharing weights. For this task, the below reward function may be used:

$$R(x_i^{t+\Delta}) = dist(x_i^t) - dist(x_i^{t+\Delta t}), \qquad (10)$$

wherein the distance function (dist) measures the distance from the agent to the target. The initial distribution S of problem settings involves the randomized agent and target positions, as well as a number of agents in each group. The random sampler ensures that initial agent positions are collision-free and target positions are at least 2r apart. In FIG. 9, the performance of the method with H=1 and H=16, the PPO baseline, and a variant of the method using ORCA are compared to provide gradient information. PPO fails by having the agents stuck among large obstacles, while learning with ORCA converges slowly. The method with either a short- (i.e., H=1) or long-horizon (i.e., H=16) achieves similarly ideal performance.

Figure 10:
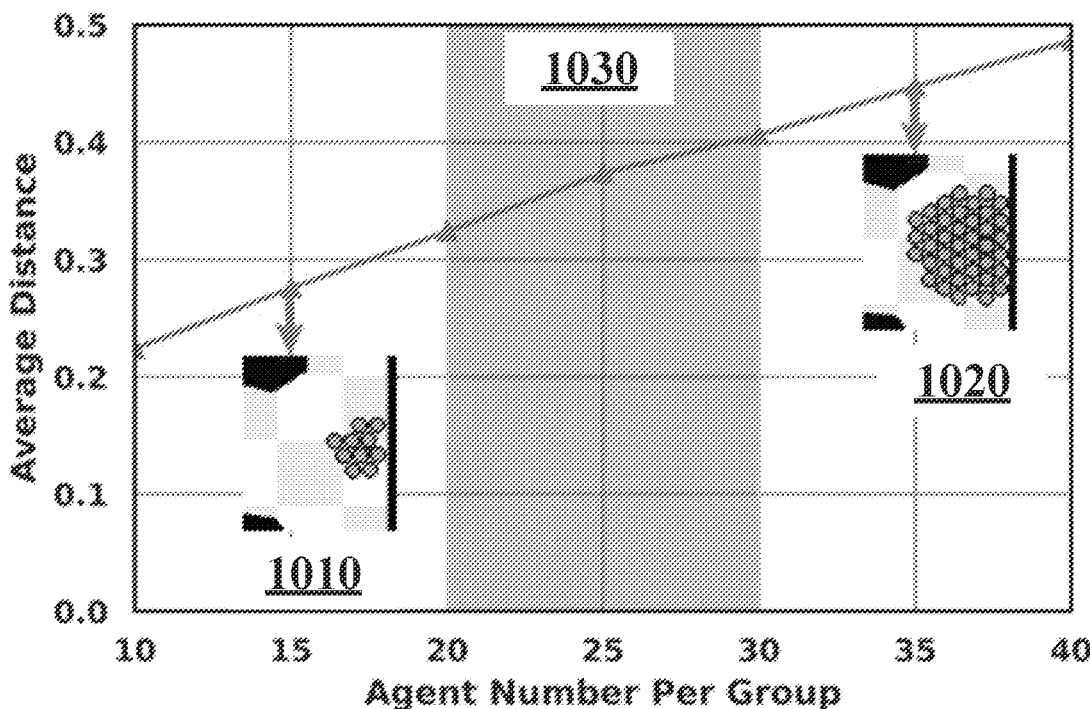
FIG. 10 shows results with various agent number per group in various embodiments in the present disclosure.

FIG. 10 shows a plot of the average ultimate agent-to-target distance, against the number of agents in each group. All the target positions are randomized and unseen. The middle shaded region (agent number from 20 to 30) (1030) is the agent number used during training. Even when a lower or higher number of agents are used, the policy maintains similar performance. Note the agent-to-target distance increases with the number of agents because the agents cluster around the target position due to the collision-free constraints as illustrated in (1010) and (1020). In FIG. 10, the learned navigation policy is evaluated on unseen, randomized target positions and agent sizes. The method generalizes to both higher and lower numbers of agents than the training setting, achieving similar policy performance.

Locking Resolution

Figure 11A:
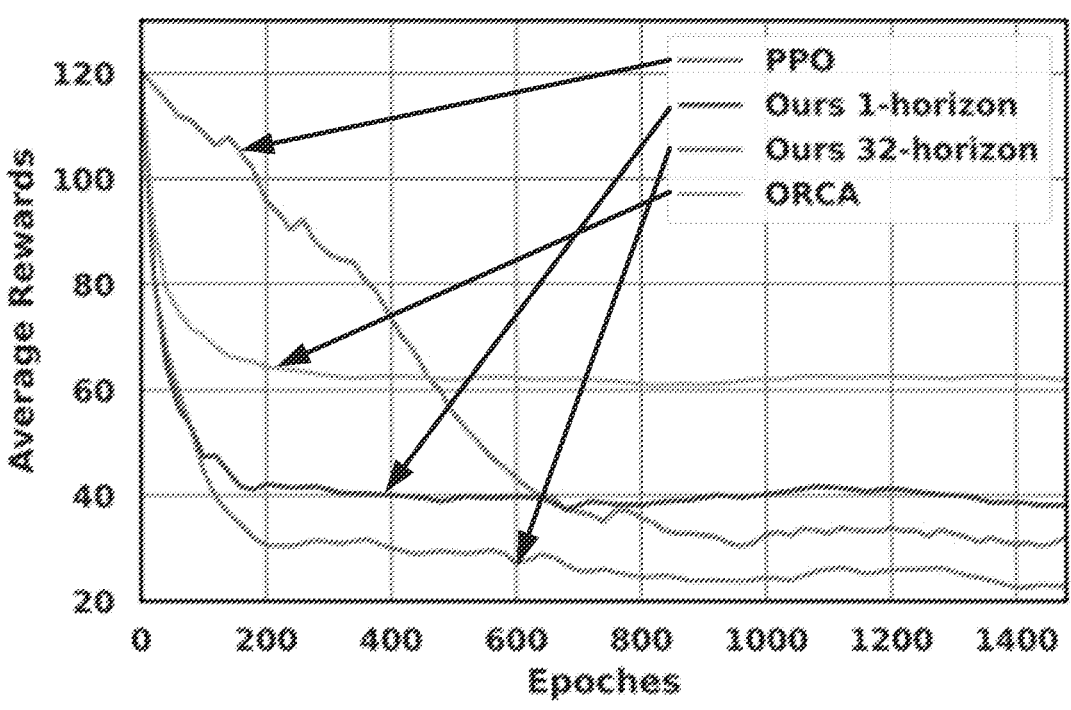
FIG. 11A shows comparison results in a highly congested scenario involving various embodiments in the present disclosure.
Figure 11B:
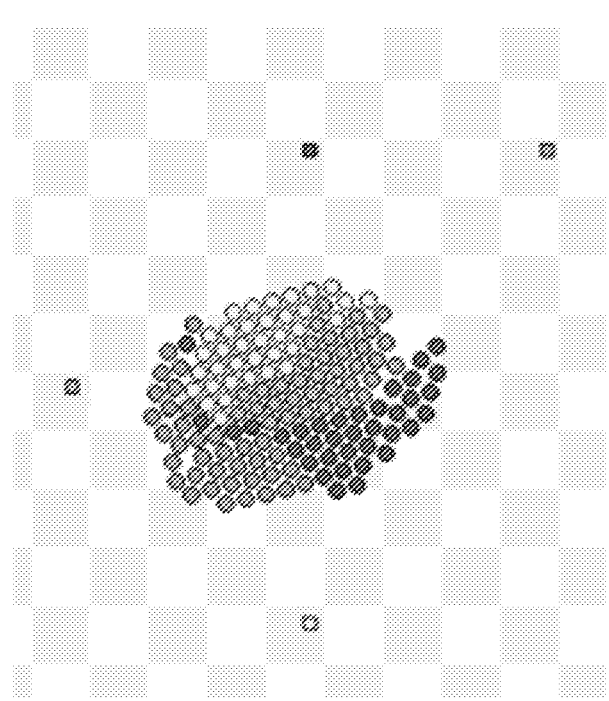
FIG. 11B shows one of the comparison results shown in FIG. 11A.

Various embodiments in the present disclosure have many other benefits, improving the technology of multi-agent navigation. In some implementations, a navigation task may be established, involving 4 groups of agents moving towards each other to reach the other side of a workspace with no obstacles. In this case, there may be many collisions among agents leading to congestion. As shown in FIG. 11A and FIG. 11B, the method trained with H=32 converges to a much better policy than one trained using H=1. Without obstacles, PPO also converges to a good policy, still inferior to the method with H=32.

Evaluation Task

Figures 12, 13:
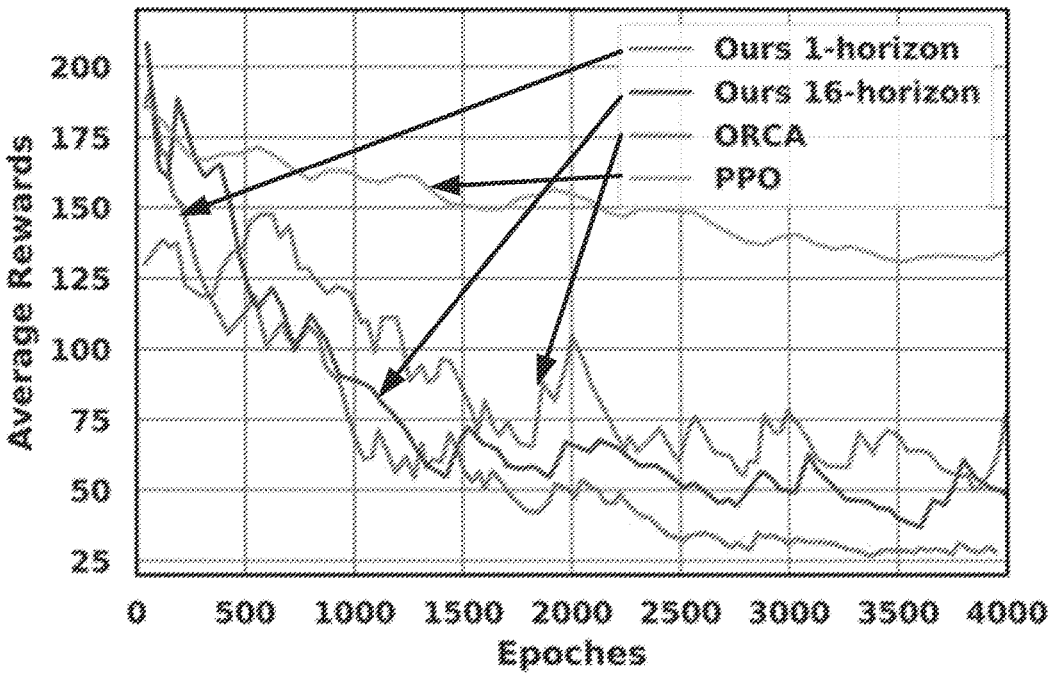
FIG. 12 shows comparison results in an evacuation task scenario involving various embodiments in the present disclosure.
FIG. 13 shows comparison results in two tasks involving various embodiments in the present disclosure.

In some implementations, referring to 1430 and 1440 in FIG. 14, another evacuation task is illustrated. It is assumed that there are M exits in the area and the agents' goal is to reach one of the M exits as fast as possible. The reward signal may be formulated as:

$$R(x_i^{t+\Delta}) = \min_{j=1,\dots,M} dist_j(x_i^t) - \min_{j=1,\dots,M} dist_j(x_i^{t+\Delta t}), \qquad (11)$$

wherein $dist_j$ measures the distance between the agent and the j-th exit, and min denotes a minimum function which returns a minimum value of the function. As compared with a previous task, this evacuation task is more challenging by involving the exit assignment problem. In this case, the policy only takes two images: 1) the agent positions and 2) the target configuration. All other settings are the same as the partially labeled navigation task. All the baselines are compared, as shown in FIG. 12, wherein the method with H=1 and H=16 achieves a similarly ideal performance.

In some implementations, the navigation policy may also be generalized to different numbers of agent groups. As shown in 1310 in FIG. 13, a system/method may be trained with M=3, and may be used with different numbers of agent groups (M=2, 3, or 4). The numbers in FIG. 13 denotes an average agent-to-target distance on a set of unseen testing problems. The results show that the method with H=32 consistently performs the best.

In some implementations, a more challenging evacuation task may not work as good as the previous task regarding to the generalization on M. As shown in 1320 in FIG. 13, 3 different policies for M=2, 3, or 4 are summarized. For the navigation task, the method with H=1 consistently performs the best. One of the reasons may be that long-horizon is particularly useful for resolving congested scenarios; and/or for the evacuation task, agents tend to find the closest exit to avoid collisions so that short-horizon training may provide more stable gradient information.

FIG. 14 shows results of various embodiments in the present disclosure. 1410 shows the initial configuration of a partially labeled navigation task with M=4 groups of agents. 1420 shows the final configuration corresponding to 1410. 1430 and 1440 show the initial and final configurations of the evacuation task with three exits (1431, 1432, and 1433).

In various embodiments, when the reward signals of navigation tasks are differentiable, the method/system may lead to an end-to-end differentiable learning architecture for collision-free navigation in obstacle-rich environments. The various differentiable navigation algorithms described in the present disclosure may also be used along, not necessarily coupled with the kernel-based policy representation. Without any limitation, the kernel representation may work with any parameterization of the neural network.

In the embodiments and implementation of this disclosure, any steps and/or operations may be combined or arranged in any amount or order, as desired. Two or more of the steps and/or operations may be performed in parallel. Embodiments and implementations in the disclosure may be used separately or combined in any order.

The techniques described above, may be implemented as computer software using computer-readable instructions and physically stored in one or more computer-readable media. For example, human accessible storage devices and their associated media include such as optical media including CD/DVD ROM/RW with CD/DVD or the like media, thumb-drive, removable hard drive or solid state drive, legacy magnetic media such as tape and floppy disc, specialized ROM/ASIC/PLD based devices such as security dongles, and the like. Those skilled in the art may also understand that term "computer readable media" as used in connection with the presently disclosed subject matter does not encompass transmission media, carrier waves, or other transitory signals.

While the particular invention has been described with reference to illustrative embodiments, this description is not meant to be limiting. Various modifications of the illustrative embodiments and additional embodiments of the invention will be apparent to one of ordinary skill in the art from this description. Those skilled in the art will readily recognize that these and various other modifications can be made to the exemplary embodiments, illustrated and described herein, without departing from the spirit and scope of the present invention. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A method for navigating multiple objects from initial positions towards target positions, the method comprising:
   obtaining, by a device comprising a memory storing instructions and a processor in communication with the memory, an initial configuration and a target configuration, the initial configuration comprising initial positions of multiple objects, and the target configuration comprising target positions of the multiple objects;
   inputting, by the device, the initial configuration and the target configuration into a neural network to generate a set of kernel parameters;
   constructing, by the device, a kernel-based divergence-free velocity field based on the set of kernel parameters;
   interpolating, by the device, the kernel-based divergence-free velocity field to extract predicted velocities of the multiple objects;
   generating, by the device, next positions of the multiple objects based on the predicted velocities according to a differentiable navigation algorithm; and
   iteratively taking, by the device until a condition is satisfied, a next configuration as the initial configuration and feeding the next configuration into the neural network to begin a next iteration, the next configuration comprising the next positions of the multiple objects.

2. The method according to claim 1, wherein:
   the neural network comprises a first convolutional neural network (CNN), a second CNN, and a multiple layer perceptron (MLP); and
   the inputting the initial configuration and the target configuration into the neural network to generate the set of kernel parameters comprises:
   inputting the initial configuration into the first CNN to generate first features,
   inputting the target configuration into the second CNN to generate second features,
   generating combined features based on the first features and the second features, and
   inputting the combined features into the MLP to generate the set of kernel parameters.

3. The method according to claim 1, wherein:
   the target configuration comprises at least one target position for each object.

4. The method according to claim 1, wherein:
   the initial configuration and the target configuration comprise a same obstacle configuration.

5. The method according to claim 1, wherein:
   the neural network comprises a set of neural-network parameters indicating a navigation policy.

6. The method according to claim 1, wherein:
   the neural network is pre-trained with a plurality of system iterations by:
   in each system iteration before a stopping condition is satisfied:
   obtaining a plurality of sampling iterations from the neural network by sampling a plurality of initial configurations,
   generating an overall reward function based on a portion of the plurality of sampling iterations, and
   updating the neural network based on gradient information of the overall reward function; and
   the stopping condition comprises at least one of the following:
   the overall reward function is bigger than a first threshold, or
   a difference of the overall reward functions from one iteration to next iteration is smaller than a second threshold.

7. The method according to claim 1, wherein the generating the next positions of the multiple objects based on the predicted velocities according to the differentiable navigation algorithm comprises:

constructing a current total-energy function of the multiple objects based on the predicted velocities and current positions of the multiple objects;

in each iteration before a stopping condition is satisfied:

obtaining a predicted navigation-vector for each object based on the current total-energy function, determining a portion of the predicated navigation-vector as a finalized navigation-vector for each object, generating a next position for each object based on the finalized navigation-vector and the current position for each object, and constructing a next total-energy function of the multiple objects based on the predicted velocities and the next positions for multiple objects and using the next total-energy function as the current total-energy function in the next iteration; and wherein, during each iteration, every trajectory of the multiple objects is collision-free among each other and the next total-energy function is smaller than the current total-energy function.

8. The method according to claim 7, wherein:

the stopping condition comprises a gradient of the current total-energy function for each object being equal to or smaller than a threshold.

9. The method according to claim 1, wherein the constructing the kernel- based divergence-free velocity field based on the set of kernel parameters comprises:

constructing a velocity field by accumulating a plurality of kernel functions based on the set of kernel parameters;

rasterizing the velocity field onto a dense grid; and projecting the rasterized velocity field according to a divergence-free condition to obtain the kernel-based divergence-free velocity field.

10. An apparatus for navigating multiple objects from initial positions towards target positions, the apparatus comprising:

a memory storing instructions; and a processor in communication with the memory, wherein, when the processor executes the instructions, the processor is configured to cause the apparatus to:

obtain an initial configuration and a target configuration, the initial configuration comprising initial positions of multiple objects, and the target configuration comprising target positions of the multiple objects;

input the initial configuration and the target configuration into a neural network to generate a set of kernel parameters;

construct a kernel-based divergence-free velocity field based on the set of kernel parameters;

interpolate the kernel-based divergence-free velocity field to extract predicted velocities of the multiple objects;

generate next positions of the multiple objects based on the predicted velocities according to a differentiable navigation algorithm; and iteratively take, until a condition is satisfied, a next configuration as the initial configuration and feed the next configuration into the neural network to begin a next iteration, the next configuration comprising the next positions of the multiple objects.

11. The apparatus according to claim 10, wherein:

the neural network comprises a first convolutional neural network (CNN), a second CNN, and a multiple layer perceptron (MLP); and when the processor is configured to cause the apparatus to input the initial configuration and the target configuration into the neural network to generate the set of kernel parameters, the processor is configured to cause the apparatus to:

input the initial configuration into the first CNN to generate first features, input the target configuration into the second CNN to generate second features, generate combined features based on the first features and the second features, and input the combined features into the MLP to generate the set of kernel parameters.

12. The apparatus according to claim 10, wherein:

the target configuration comprises at least one target position for each object.

13. The apparatus according to claim 10, wherein:

the initial configuration and the target configuration comprise a same obstacle configuration.

14. The apparatus according to claim 10, wherein:

the neural network comprises a set of neural-network parameters indicating a navigation policy.

15. The apparatus according to claim 10, wherein:

the neural network is pre-trained with a plurality of system iterations by:

in each system iteration before a stopping condition is satisfied:

obtaining a plurality of sampling iterations from the neural network by sampling a plurality of initial configurations, generating an overall reward function based on a portion of the plurality of sampling iterations, and updating the neural network based on gradient information of the overall reward function; and the stopping condition comprises at least one of the following:

the overall reward function is bigger than a first threshold, or a difference of the overall reward functions from one iteration to next iteration is smaller than a second threshold.

16. The apparatus according to claim 10, wherein, when the processor is configured to cause the apparatus to generate the next positions of the multiple objects based on the predicted velocities according to the differentiable navigation algorithm, the processor is configured to cause the apparatus to:

construct a current total-energy function of the multiple objects based on the predicted velocities and current positions of the multiple objects;

in each iteration before a stopping condition is satisfied:

obtain a predicted navigation-vector for each object based on the current total-energy function, determine a portion of the predicated navigation-vector as a finalized navigation-vector for each object, generate a next position for each object based on the finalized navigation-vector and the current position for each object, and construct a next total-energy function of the multiple objects based on the predicted velocities and the next positions for multiple objects and using the next total-energy function as the current total-energy function in the next iteration; and wherein, during each iteration, every trajectory of the multiple objects is collision-free among each other and the next total-energy function is smaller than the current total-energy function.

17. The apparatus according to claim 16, wherein:

the stopping condition comprises a gradient of the current total-energy function for each object being equal to or smaller than a threshold.

18. The apparatus according to claim 10, wherein, when the processor is configured to cause the apparatus to construct the kernel-based divergence-free velocity field based on the set of kernel parameters, the processor is configured to cause the apparatus to:

construct a velocity field by accumulating a plurality of kernel functions based on the set of kernel parameters;

rasterize the velocity field onto a dense grid; and project the rasterized velocity field according to a divergence-free condition to obtain the kernel-based divergence-free velocity field.

19. A non-transitory computer readable storage medium storing instructions, wherein, when the instructions are executed by a processor, the instructions are configured to cause the processor to:

obtain an initial configuration and a target configuration, the initial configuration comprising initial positions of multiple objects, and the target configuration comprising target positions of the multiple objects;

input the initial configuration and the target configuration into a neural network to generate a set of kernel parameters;

construct a kernel-based divergence-free velocity field based on the set of kernel parameters;

interpolate the kernel-based divergence-free velocity field to extract predicted velocities of the multiple objects;

generate next positions of the multiple objects based on the predicted velocities according to a differentiable navigation algorithm; and iteratively take, until a condition is satisfied, a next configuration as the initial configuration and feed the next configuration into the neural network to begin a next iteration, the next configuration comprising the next positions of the multiple objects.

20. The non-transitory computer readable storage medium according to claim 19, wherein:

the neural network comprises a first convolutional neural network (CNN), a second CNN, and a multiple layer perceptron (MLP); and when the instructions are configured to cause the processor to input the initial configuration and the target configuration into the neural network to generate the set of kernel parameters, the instructions are configured to cause the processor to:

input the initial configuration into the first CNN to generate first features, input the target configuration into the second CNN to generate second features, generate combined features based on the first features and the second features, and input the combined features into the MLP to generate the set of kernel parameters.

\* \* \* \* \*